US012596806B2

(12) United States Patent
Peisert

(10) Patent No.: US 12,596,806 B2
(45) Date of Patent: Apr. 7, 2026

(54) METHODS, SYSTEMS, AND DEVICES FOR TRUSTED EXECUTION ENVIRONMENTS AND SECURE DATA PROCESSING AND STORAGE ENVIRONMENTS

(71) Applicant: The Regents of the University of California, Oakland, CA (US)

(72) Inventor: Sean Peisert, San Rafael, CA (US)

(73) Assignee: The Regents of the University of California, Oakland, CA (US)

( * ) Notice: Subject to any disclaimer, the term of this patent is extended or adjusted under 35 U.S.C. 154(b) by 556 days.

(21) Appl. No.: 17/615,034

(22) PCT Filed: May 28, 2020

(86) PCT No.: PCT/US2020/034994
§ 371 (c)(1),
(2) Date: Nov. 29, 2021

(87) PCT Pub. No.: WO2020/243362
PCT Pub. Date: Dec. 3, 2020

(65) Prior Publication Data
US 2022/0229908 A1 Jul. 21, 2022

Related U.S. Application Data

(60) Provisional application No. 62/854,259, filed on May 29, 2019.

(51) Int. Cl.
*G06F 21/57* (2013.01)
*G06F 21/31* (2013.01)
(Continued)

(52) U.S. Cl.
CPC .............. *G06F 21/57* (2013.01); *G06F 21/31* (2013.01); *G06F 21/602* (2013.01);
(Continued)

(58) Field of Classification Search
CPC ........ G06F 21/57; G06F 21/31; G06F 21/602; G06F 21/604; G06F 21/78; G06F 2221/034
See application file for complete search history.

(56) References Cited

U.S. PATENT DOCUMENTS 10,700,865 B1 * 6/2020 Hendrick ............ G06F 21/6218
10,853,350 B1 * 12/2020 Sharifi Mehr ...... G06F 16/2365
(Continued)

FOREIGN PATENT DOCUMENTS

WO 2020343362 A1 12/2020

OTHER PUBLICATIONS

Dwork, Cynthia. Differential Privacy. In Proceedings of the 33rd International Colloquium on Automata, Languages and Programming, Part II (ICALP), vol. 4052 of Lecture Notes in Computer Science, pp. 1-12. Springer Verlag, Jul. 2006.
(Continued)

*Primary Examiner* — Theodore C Parsons
*Assistant Examiner* — Alan L Kong
(74) *Attorney, Agent, or Firm* — Womble Bond Dickinson (US) LLP

(57) ABSTRACT

Disclosed herein are methods, systems, and devices for implementing trusted execution environments in the context of data security and data storage. Systems may include a login node comprising one or more processors configured to receive a request from a user, and a secure access port communicatively coupled to the login node and configured to process the request in accordance with one or more data access policies. Systems may further include a secure processing device communicatively coupled to the secure access port and comprising an encrypted portion configured to implement one or more data processing operations associated with the request. The systems may also include an
(Continued)

encrypted data repository communicatively coupled to the secure processing device, the encrypted data repository comprising one or more storage devices, and being configured to encrypt and store data in the one or more storage devices.

20 Claims, 7 Drawing Sheets

(51) Int. Cl.
    *G06F 21/60*     (2013.01)
    *G06F 21/78*     (2013.01)
(52) U.S. Cl.
    CPC ............ *G06F 21/604* (2013.01); *G06F 21/78* (2013.01); *G06F 2221/034* (2013.01)

(56)           References Cited

U.S. PATENT DOCUMENTS

| | | | |
|---|---|---|---|
| 2010/0199104 A1 | 8/2010 | Rijnswou | |
| 2011/0167477 A1* | 7/2011 | Piccirillo | H04L 9/3271 726/4 |
| 2014/0164791 A1 | 6/2014 | Chaturvedi et al. | |
| 2014/0317420 A1* | 10/2014 | Daniels | G06F 21/6218 713/193 |
| 2015/0270956 A1* | 9/2015 | Basmov | G06F 21/74 713/189 |
| 2015/0317490 A1* | 11/2015 | Carey | G16B 20/00 726/26 |
| 2016/0117506 A1* | 4/2016 | Buer | G06F 21/567 726/1 |
| 2017/0097881 A1* | 4/2017 | Hodel | G06F 11/3672 |
| 2019/0197246 A1* | 6/2019 | Viswanathan | G06F 21/6227 |
| 2019/0362083 A1* | 11/2019 | Ortiz | G06N 20/00 |

OTHER PUBLICATIONS

Globalplatform, Inc. Introduction to Trusted Execution Environments. https://globalplatform.org/wp-content/uploads/2018/05/ Introduction-to-Trusted-Execution-Environment-15May2018.pdf, May 2018.

International Application Serial No. PCT/US20/34994, Preliminary Report on Patenability mailed Dec. 9, 2021, 8 pgs.

Mohamed Sabt, Mohammed Achernial, and Abdelmadjid Bouabdallah. Trusted Execution Environment: What It Is, and What It Is Not. In 14th IEEE International Conference on Trust, Security and Privacy in Computing and Communications, 2015.

Peisert, Sean. "Leveraging Trust Execution Environments for Secure, Privacy-Preserving Data Processing", Lawrence Berkeley National Laboratory & University of California, Davis, Jan. 13, 2019. 10 pages.

Peisert, Sean. "Usable Computer Security and Privacy to Enable and Encourage Data Sharing for Scientific Research", Lawrence Berkeley National Laboratory and University of California, Davis. National Academies of Science, Engineering and Medicine COSEMPUP meeting. Washington, D.C. Nov. 8, 2018. 37 pages.

Int'l Application No. PCT/US20/34994, International Search Report and Written Opinion mailed Aug. 12, 2020.

Akram et al., "Enabling DesignSpaceExplorationforRISC-VSecureCompute Environments", Proceedings of the Fifth Workshop on Computer Architecture Research with RISC-V (CARRV), (co-located with ISCA 2021) Jun. 17, 2021.

Peisert, "Trustworthy Scientific Computing," Communications of the ACM (CACM), vol. 64, No. 5, pp. 18-21, (May 2021).

Akram et al., "Performance Analysis of Scientific Computing Workloads on General Purpose TEEs," Proceedings of the 35th IEEE International Parallel & Distributed Processing Symposium (May 17-21, 2021).

Akram, "Trusted Execution for High-Performance Computing," Proceedings of the 15th EuroSys Doctoral Workshop (EuroDW), 2021.

Akram, "Architectures for Secure High-Performance Computing," Proceedings of the Young Architect Workshop (YArch) held in conjunction with the International Conference on Architectural Support for Programming Languages and Operating Systems (ASPLOS), April 202.

Akram et al., "Performance Analysis of Scientific Computing Workloads on Trusted Execution Environments," arXiv preprint arXiv:2010.13216, Oct. 25, 2020.

\* cited by examiner

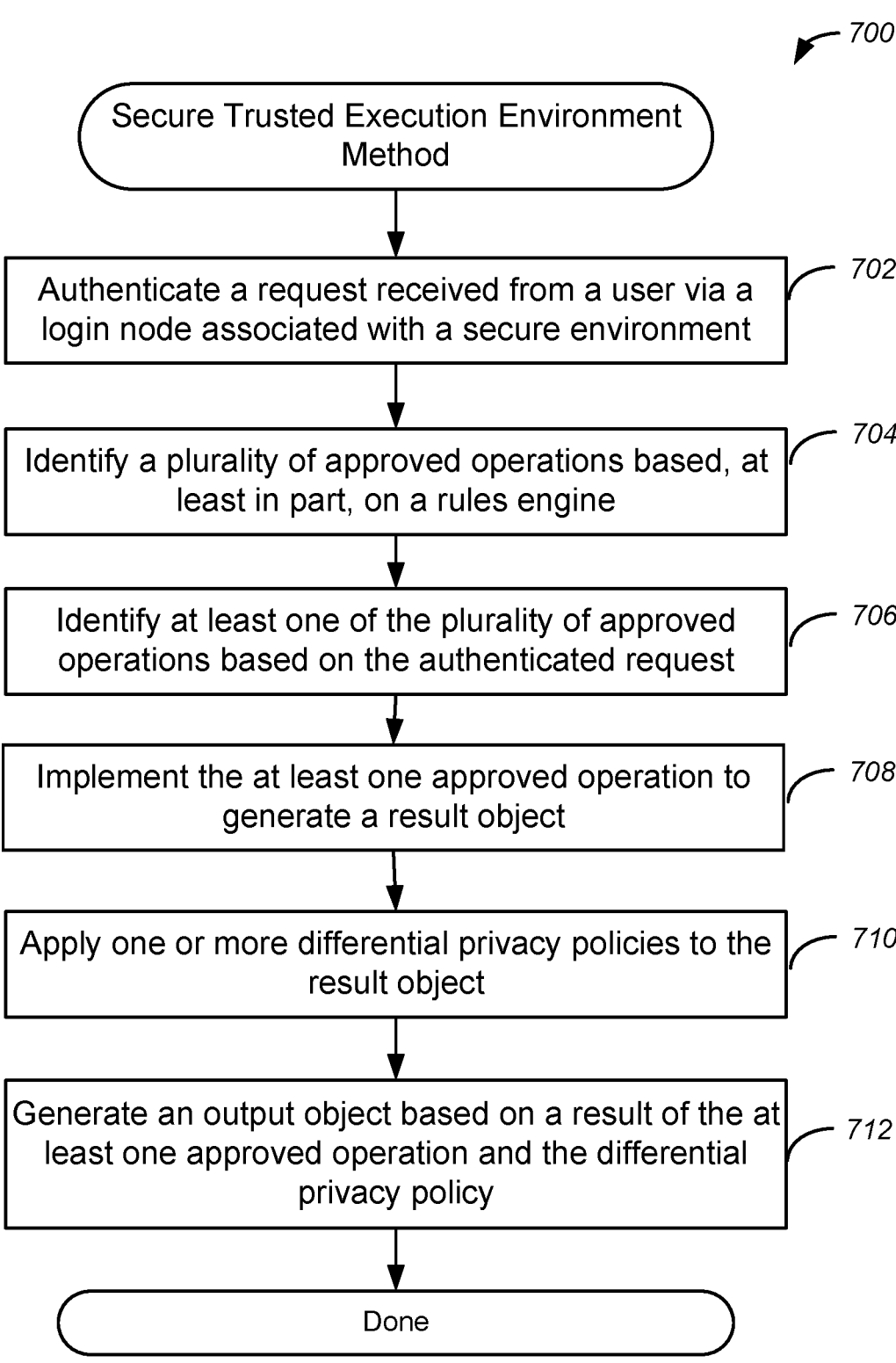

700

Secure Trusted Execution Environment
Method

Authenticate a request received from a user via a
login node associated with a secure environment          702

Identify a plurality of approved operations based, at
least in part, on a rules engine          704

Identify at least one of the plurality of approved
operations based on the authenticated request          706

Implement the at least one approved operation to
generate a result object          708

Apply one or more differential privacy policies to the
result object          710

Generate an output object based on a result of the at
least one approved operation and the differential
privacy policy          712

Done

*FIG. 7*

METHODS, SYSTEMS, AND DEVICES FOR TRUSTED EXECUTION ENVIRONMENTS AND SECURE DATA PROCESSING AND STORAGE ENVIRONMENTS

CROSS-REFERENCE TO RELATED APPLICATIONS

This application claims the benefit under 35 U.S.C. § 119 (e) of U.S. Provisional Patent Application No. 62/854,259, filed on May 29, 2019, and International Application PCT/US20/34994, filed on May 28, 2020, which are incorporated herein by reference in its entirety for all purposes.

STATEMENT OF GOVERNMENT SUPPORT

This invention was made with government support under Contract No. DE-AC02-05CH11231 awarded by the U.S. Department of Energy. The government has certain rights in this invention.

TECHNICAL FIELD

This disclosure relates generally to data security, and more particularly to implementing trusted execution environments in the context of data security and data storage.

BACKGROUND

The storage and handling of sensitive data typically utilizes security measures with various levels of security. Some data may be stored in isolated and locked-down environments which have onerous access requirements. For example, some systems utilize an "airlock" in which data or software must first be copied to an ingress point referred to as an "airlock". They must then receive approval from a second individual (e.g., security administrator, project principal investigator, or other individual involved in a "two person" rule or system), and perhaps also pass through a virus scanning process, before being permitted into the compute environment. Then, in order for a user to interact with the environment, the user often must connect to an entry point via a virtual private network, then use a "remote desktop" solution to interface with the computing tools, in which the only information moving back and forth to the user are pixels. Accordingly, in such situations, all "cut," "copy," and "paste" is disabled to prevent transfer of information between the user and the compute environment except through the "airlock". Such system requirements impose onerous usability requirements on users because users are not able to use such systems efficiently and in a distributed manner. Accordingly, such systems remain limited in their ability to provide secure data storage environments that are easily scalable and are not overly burdensome on users.

SUMMARY

Disclosed herein are methods, systems, and devices for implementing trusted execution environments in the context of data security and data storage. Systems may include a login node including one or more processors configured to receive a request from a user, a secure access port communicatively coupled to the login node and configured to process the request in accordance with one or more data access policies, and a secure processing device communicatively coupled to the secure access port and including an encrypted portion configured to implement one or more data processing operations associated with the request. Systems may also include, an encrypted data repository communicatively coupled to the secure processing device, the encrypted data repository including one or more storage devices, and being configured to encrypt and store data in the one or more storage devices.

In some embodiments, the secure access port includes a container configured to implement a sandbox layer. In various embodiments, the container is configured to implement a virtual environment. According to various embodiments, the secure processing device is configured to implement hardware encryption. In some embodiments, the hardware encryption of the secure processing device is implemented via a secure portion of a main processor. In various embodiments, the secure processing device is configured to implement software encryption. According to various embodiments, systems also include an additional secure access port communicatively coupled to the login node and configured to process a response to the request in accordance with one or more data access policies. In some embodiments, the login node is one of a plurality of nodes in cluster of nodes.

Also disclosed herein are methods that may include receiving a request from a user via a login node, the request being associated with a secure environment, authenticating the user associated with the request, the authenticating being implemented via the login node, determining, using a secure processing device of a secure environment, if one or more data processing operations should be implemented based on the received request, and initiating communication with an encrypted data repository in response to the determining, the encrypted data repository being communicatively coupled to the secure environment.

In some embodiments, the authenticating further includes authenticating a key included in the request. In various embodiments, the determining further includes identifying a designated access policy based, at least in part, on the received request. According to various embodiments, the methods also include instantiating a container based, at least in part, on the identified access policy. In some embodiments, the instantiating of the container further includes implementing a sandbox layer. In various embodiments, the request is a data access request.

Further disclosed herein are devices that may include a secure access port communicatively coupled to a login node and configured to receive a request from the login node, the secure access port being further configured to process the request in accordance with one or more data access policies. Devices may also include a secure processing device communicatively coupled to the secure access port and including an encrypted portion configured to implement one or more data processing operations associated with the request, the secure processing device being communicatively coupled to an encrypted data repository.

In some embodiments, the secure access port includes a container configured to implement a sandbox layer. In various embodiments, the container is configured to implement a virtual environment. According to various embodiments, the secure processing device is configured to implement hardware encryption. In some embodiments, the secure processing device includes a main processor, and wherein the main processor includes a secure portion encrypted at a hardware level. In various embodiments, the device further includes an additional secure access port communicatively coupled to the login node and configured to process a response to the request in accordance with one or more data access policies.

Details of one or more embodiments of the subject matter described in this specification are set forth in the accompanying drawings and the description below. Other features, aspects, and advantages will become apparent from the description, the drawings, and the claims.

BRIEF DESCRIPTION OF THE DRAWINGS

FIG. 7 illustrates a flow chart of an additional example of a method for implementing a secure trusted execution environment in accordance with some embodiments.

DETAILED DESCRIPTION

In the following description, numerous specific details are set forth in order to provide a thorough understanding of the presented concepts. The presented concepts may be practiced without some or all of these specific details. In other instances, well-known process operations have not been described in detail so as to not unnecessarily obscure the described concepts. While some concepts will be described in conjunction with the specific examples, it will be understood that these examples are not intended to be limiting.

Figure 1:
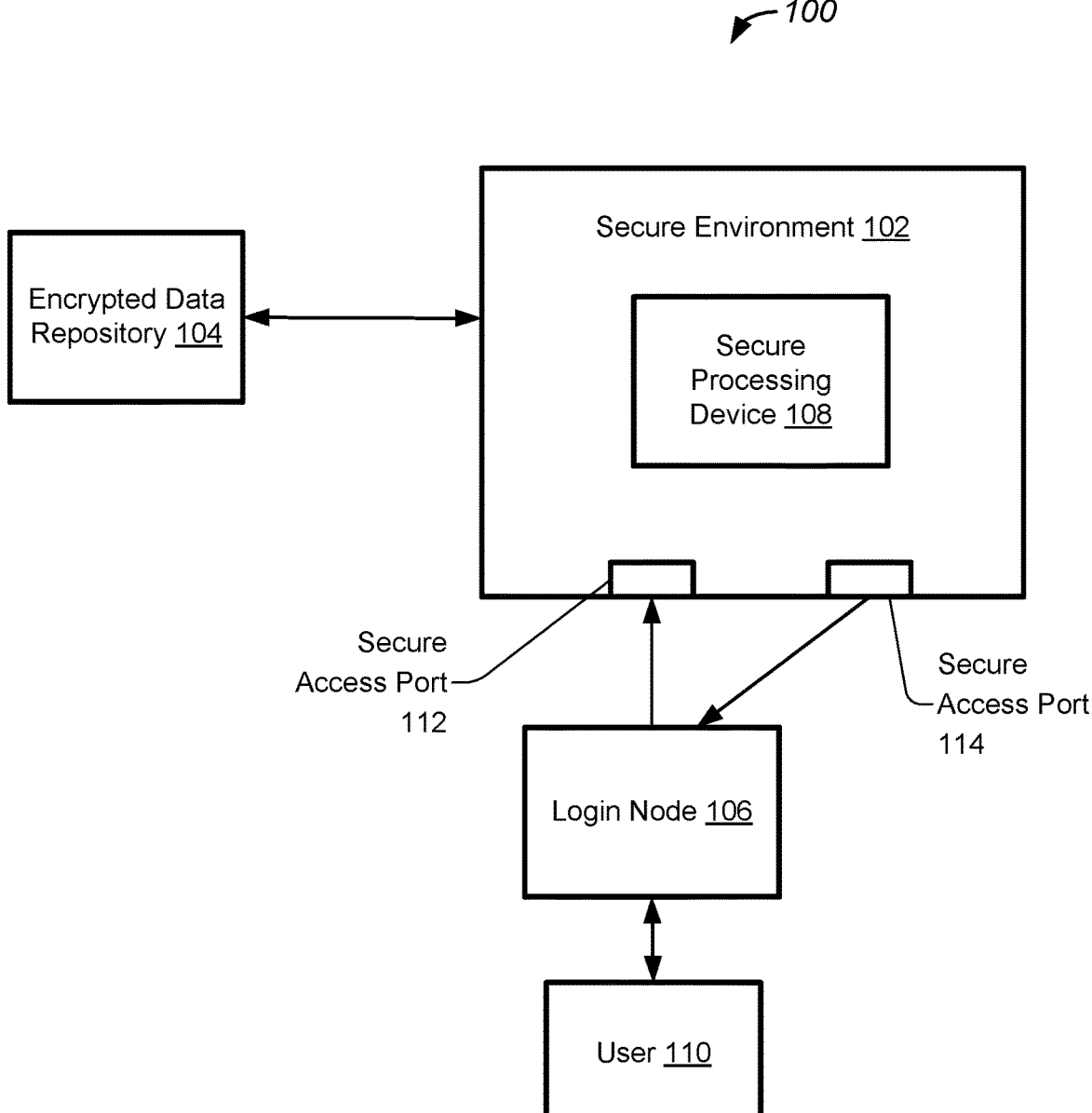
FIG. 1 illustrates an example of a system for implementing a secure trusted execution environment, configured in accordance with some embodiments.

FIG. 1 illustrates an example of a system for implementing a secure trusted execution environment, configured in accordance with some embodiments. As will be discussed in greater detail below, systems, such as system 100, may be configured to implement a secure data storage environment in a manner that is not overly burdensome when handling data storage and retrieval operations, and also in a manner that may be scalable as well as distributed. Accordingly, as will be discussed in greater detail below, system 100 may be implemented such that additional resources may be added to the secure environment as needed in a scalable manner. Moreover, such resources may be located in different regions and physical locations, thus enabling the implementation of such a secure environment in a distributed manner.

In various embodiments, system 100 may include secure environment 102 which is configured to store data in a secure manner. As shown in FIG. 1, secure environment 102 is configured to communicate with various other system components, such as encrypted data repository 104 and login node 106 which will be discussed in greater detail below. In various embodiments, secure environment 102 includes one or more processing devices, such as secure processing device 108 which may be configured to implement a trusted execution environment that is used to process and handle data. In various embodiments, the secure processing device 108 is configured to include a secure area of a main processor of secure environment 102 that ensures sensitive data is stored, processed, and protected in an isolated and trusted environment. Accordingly, the trusted execution environment provided by secure processing device 108 is configured to broker access to storage of sensitive data, and ensures that the sensitive data is processed in a manner in which it is isolated from other trusted components and also from non-trusted components. Accordingly, a trusted execution environment provided by secure processing device 108 is configured to protect sensitive code and data from system administrators and from attackers who may exploit kernel vulnerabilities and obtain control over the entire software stack, including an operating system and a hypervisor.

In some embodiments, secure processing device 108 is configured to implement encryption of data at a hardware level, and include a secure area of its main processor. For example, data may be stored and processed by a secure enclave of secure processing device 108 that implements encryption at the hardware level, thus maintaining encryption of the data at all times. Moreover, different portions of secure processing device 108 may be encrypted using different keys, thus supporting multiple different secure partitions within the secure enclave, and thus supporting multi-tenant operation. In various embodiments, multi-tenant operation may be supported without encryption, and may be implemented using containerization. Accordingly, secure processing device 108 may be configured to In some embodiments, secure processing device 108 may be a processing device that includes a processor that is specifically configured to implement the secure execution environment described above, as may be accomplished via the utilization of encryption at the hardware level. For example, secure processing device 108 may be an Intel® SGX compatible processor. In other embodiments, secure processing device 108 may be a processing device that includes a processor that is an AMD® Epyc™ compatible processor. It will be appreciated that secure processing device 108 may be any suitable processing device such as a reduced instruction set computer (RISC) processor, which may be a RISC-V processor, an advanced RISC Machines (ARM) processor, or such as an NVIDIA® processor. Accordingly, various different configurations of secure processing device 108 are contemplated and disclosed herein. As will be discussed in greater detail below, secure processing device 108 may be implemented in one of several computer systems and/or data processing systems used to implement secure environment 102. In some embodiments, secure processing device 108 may be implemented by utilizing homomorphic encryption or smart contracts, such as blockchain-based smart contracts. Accordingly, security of the environment might not be implemented at a hardware level, but may instead be implemented via a higher level encryption that may be implemented at a software level.

In various embodiments, secure processing device 108 may be configured to store and maintain one or more policies and/or rules implemented as a rules engine. The policies and rules implemented by the rules engine may be configured to implement various data access and permissions that govern the implementation of data storage, movement, and processing operations that may be permitted in a given circumstance. Additional details of such policies and rules are discussed in greater detail below. In some embodiments, such policies and/or rules may be stored in a storage device, and the storage device may be included in the secure processing device.

In various embodiments secure environment 102 may be communicatively coupled to encrypted data repository 104 which is configured to provide encrypted system storage of sensitive data that is maintained by system 100. Accordingly, encrypted data repository 104 is configured to have a secure connection to secure environment 102 and is configured to receive data from secure environment 102 and provide data to secure environment 102 in accordance with access granted by secure environment 102. As shown in FIG. 1, access to encrypted data repository 104 is controlled by secure environment 102, and an end user, such as user 110, is not provided direct access.

As also shown in FIG. 1, secure environment 102 may also be coupled to login node 106 which may be a processing device that is configured to communicate with an end user, such as user 110, and implement authentication operations associated with user 110. In this way, login node 106 is configured to handle one or more authentication operations associated with user 110 to determine if the user is authentic, and should be allowed to communicate with secure environment 102. While login node 106 is shown as outside of secure environment 102, in some embodiments, login node 106 may be implemented within secure environment 102. Moreover, in some embodiments, login node 106 may be implemented as a node in a cluster of nodes.

In various embodiments, communication between login node 106 and secure processing device 108 may be managed by secure access ports, such as secure access port 112 and secure access port 114. In various embodiments, secure access ports 112 and 114 are configured to implement one or more of the permissions or rules described above. For example, storage and/or retrieval requests may be granted or denied based on the permissions and rules, and may be implemented in a manner dependent on one or more properties of the user, such as the user's role. As shown in FIG. 1, secure access ports 112 and 114 may be configured to handle in-bound and out-bound requests with respect to secure environment 102. More specifically, secure access port 112 may be configured to implement rules and/or policies for received requests, and secure access port 114 may be configured to implement rules and/or policies for responses provided to login node 106 and/or user 110. Further still, secure access ports 112 and 114 may be implemented in the context of a sandbox layer. In this way, the access provided to login node 106 may be sandboxed in a container to provide an additional level of security and separation between login node 106 and user 110. In some embodiments, the container may be implemented as a virtual machine. Moreover, the return of data to user 110 is managed such that no raw data is returned to user 110 unless approved by a designated output policy. While the return of data has been illustrated as being provided through login node 106, in various embodiments, secure access port 114 may be configured to communicate with user 110 directly.

As discussed above, secure access ports, such as secure access port 112 and 114, may be implemented as part of a container that is configured to isolate or sandbox a processing environment accessible by a user. Accordingly, the sandbox provided by the container is configured to gate accesses and interactions between secure processing environment 102 and login node 106 as well as user 110. In some embodiments, the sandboxing may be provided, at least in part, by components of a container platform, such as Docker, or features of an operating system, such as UNIX. In some embodiments, the sandboxing may be implemented based on an overlay network built into a container orchestration management platform that may be used to force all network output to follow a specific path that guides all output through one or more policies defined by the rules engine.

In one example, a researcher may be analyzing medical images for a specific condition. The researcher may want to test an image processing algorithm against large datasets to validate accuracy of the image processing algorithm. In this example, the researcher does not necessarily need to see the raw data. For their purposes, the researcher needs to see general statistics about the contents of the data, such as the average size of a particular feature (e.g., a tumor). In this example, a rule or policy defined by the rules engine may restrict outputs to such general statistical results. In some embodiments, a differential privacy policy may be applied in which statistics may be output but only after one or more operations has been implemented, such as the addition of LaPlace noise, and query results may be kept private.

In another example, masking may be applied to particular data fields. For example, a particular security constraint, such as the Health Insurance Portability and Accountability Act (HIPAA) Safe Harbor rule, may indicate that 18 particular identifiers need to be removed. Accordingly, the rules engine may identify particular data fields, and the strip them out before an output is returned to the user.

In various embodiments, user 110 may be an end user requesting access to data stored in encrypted data repository 104, or requesting to store data in encrypted data repository 104. Accordingly, user 110 may have one of various roles, such as a statistician, researcher, intern, or administrator. Moreover, each role may have particular permissions and rules associated with it, and such permissions and rules may be implemented by the secure processing device 108 and secure access ports 112 and 114 described above. In some embodiments, user 110 may be an application or an automated process. Accordingly, user 110 may be a component of an application that is requesting access to or storage of data in encrypted data repository 104. As will be discussed in greater detail below, in such embodiments, requests issued by the user may include one or more data values as well as one or more identified instructions or processing operations that are requested to be performed on the data values. In such embodiments, secure environment 102 may receive the data values and implement the processing operations within the secure enclave provided by secure environment 102. In this way, particular processing operations may be isolated and compartmentalized such that they are only implemented within secure environment 102, and communication with an application requesting such processing operations may be facilitated via a communications node, such as login node 106.

Additional implementations of systems are described in greater detail below with reference to FIGS. 2 and 3. It will be appreciated that features of components, such as secure access ports, secure environments, secure processing devices, login nodes, users, and encrypted data repositories, discussed above may also apply to additional components discussed below with reference to FIGS. 2 and 3.

Figure 2:
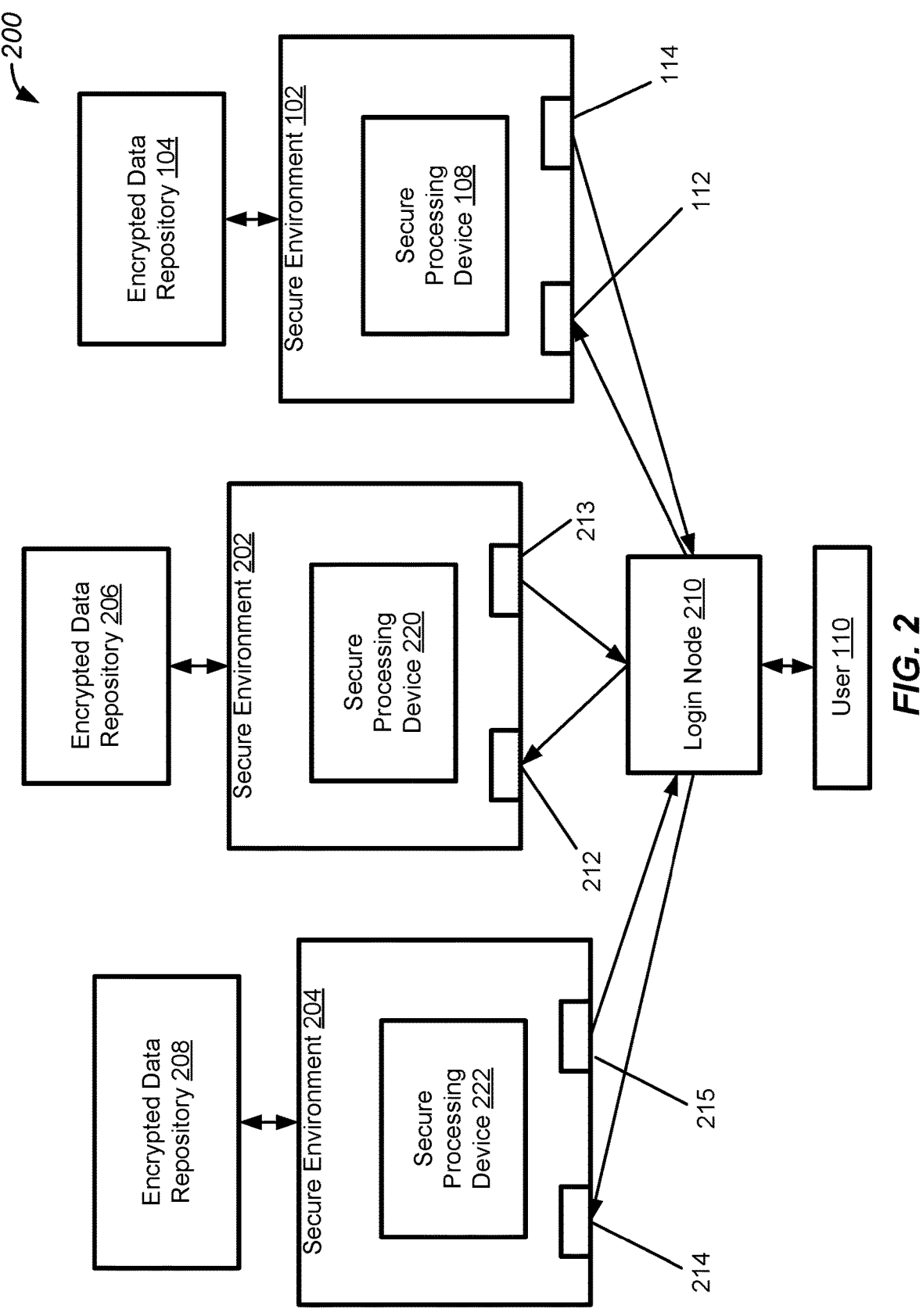
FIG. 2 illustrates another example of a system for implementing a secure trusted execution environment, configured in accordance with some embodiments.

FIG. 2 illustrates another example of a system for implementing a secure trusted execution environment, configured in accordance with some embodiments. As discussed above, a system, such as system 200, may include a secure environment, such as secure environment 102, which includes secure processing device 108 and is coupled to encrypted data repository 104. However, as shown in FIG. 2, there may also be additional secure environments, such as secure environment 202 and secure environment 204 which may include secure processing devices, such as secure processing device 220 and secure processing device 222. In this way, system 200 may be implemented in a distributed manner in which system 200 includes multiple secure environments which may be implemented at multiple different physical locations and/or sites. Accordingly, in system 200, data operations may be implemented in parallel or sequentially using secure environments at different sites and locations and in a distributed manner.

In various embodiments, secure environment 202 and secure environment 204 are coupled to their own encrypted data repositories, such as encrypted data repository 206 and encrypted data repository 208, respectively. Moreover, secure environment 102, secure environment 202, and secure environment 204, may all be coupled to a login node, such as login node 210 which may be configured as discussed above with reference to login node 106, and which may be in communication with a user, such as user 110. The communication between the secure environments and login node 210 may be managed, at least in part, by various secure access ports, such as secure access ports 112 and 114, secure access ports 212 and 213, and secure access ports 214 and 215.

Figure 3:
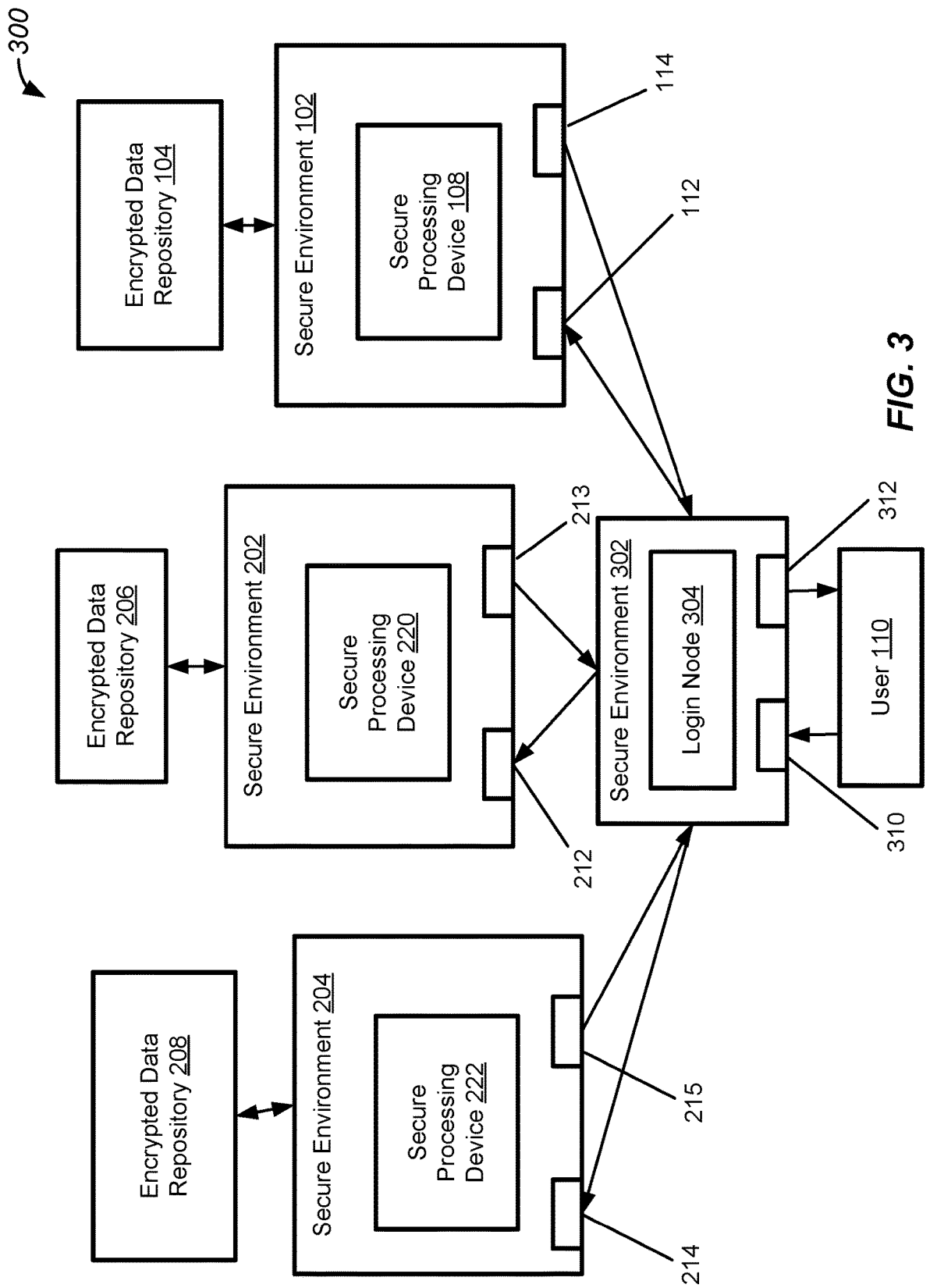
FIG. 3 illustrates yet another example of a system for implementing a secure trusted execution environment, configured in accordance with some embodiments.

FIG. 3 illustrates yet another example of a system for implementing a secure trusted execution environment, configured in accordance with some embodiments. As discussed above, a system, such as system 300, may include various secure environments, such as secure environment 102, secure environment 202, and secure environment 204, which may be coupled to encrypted data repositories, such as encrypted data repository 104, encrypted data repository 206, and encrypted data repository 208. As discussed above, the secure environments may include secure processing devices, such as secure processing device 108, secure processing device 220, and secure processing device 222. The secure environments may also include various secure access ports, such as secure access ports 112 and 114, secure access ports 212 and 213, and secure access ports 214 and 215.

As shown in FIG. 3, system 300 may further include secure environment 302 which may include login node 304, as well as secure access port 310 and secure access port 312. Accordingly, login node 304 may be implemented in its own secure environment, and one or more data access rules and/or permissions, such as data privacy rules, may be implemented at secure environment 302 of login node 304, which is communicatively coupled to user 110. In this way, secure environment 102, secure environment 202, and secure environment 204 may be implemented in the distributed manner discussed above. However, the access of user 110 to secure environment 102, secure environment 202, and secure environment 204 may be managed by secure environment 302 of login node 304 in a centralized manner, and in a way that provides an additional layer of separation between user 110 and the respective encrypted data repositories.

Figure 4:
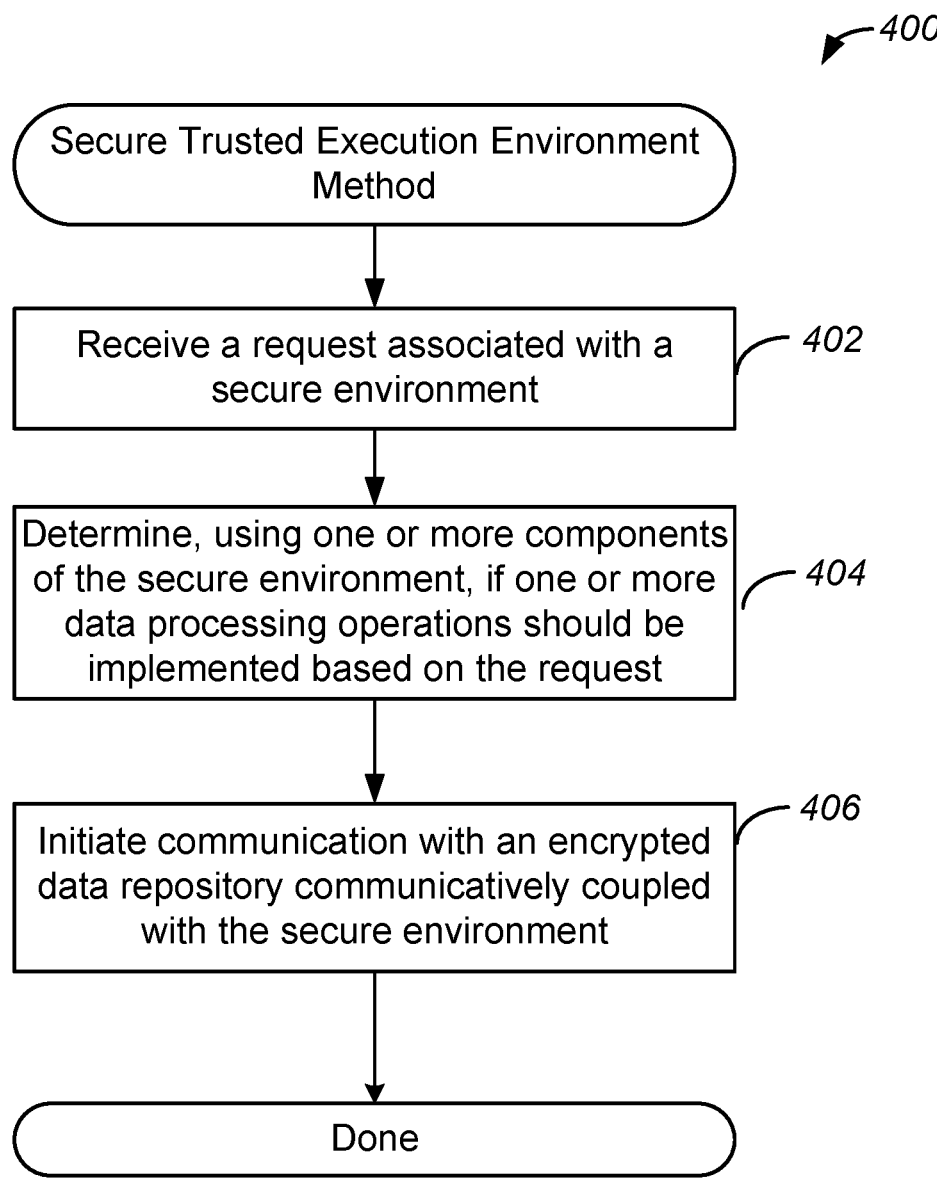
FIG. 4 illustrates a flow chart of an example of a method for implementing a secure trusted execution environment in accordance with some embodiments.

FIG. 4 illustrates a flow chart of an example of a method for implementing a secure trusted execution environment in accordance with some embodiments. As discussed above, such secure environments may be implemented to support scalable and efficient storage and retrieval of data in environments in which sensitive data is stored and maintained.

Accordingly, method 400 may commence with operation 402 a request may be received at a secure environment. For example, a user may generate or initiate a request by requesting data from an encrypted data repository. The request may be received by a login node, authenticated, and passed along the secure environment if authentication is successful. Similarly, such a request may be passed along to the secure environment if a request to store data is issued. Furthermore, as noted above, such a request may be received from a user that is actually an automated process or an application. Accordingly, the request may include data as well as requested processing operations to be implemented on the data.

Method 400 may proceed to operation 404, during which one or more components of the secure environment may determine if one or more operations should be implemented based on the request. Accordingly, one or more components of the secure environment, such as a secure processing device and a secure access port, may determine if one or more operations should be implemented based on the received request, as well as one or more parameters associated with the request. Some examples of such operations may include data storage operations and data retrieval operations. Furthermore, as discussed above, the determination of whether or not such operations should be implemented may be made based on one or more rules and/or permissions, as discussed above. If it is determined that the operations should be implemented, the request and associated data may be passed along to the secure processing device for implementation of such operations. In this way, the secure enclave provided by the secure processing device is utilized to handle the received request.

Method 400 may proceed to operation 406, during which communication may be initiated with an encrypted data repository. Accordingly, if it is determined that data processing operations should be implemented in accordance with the received request, such operations may be implemented at the encrypted data repository. As discussed above, if the appropriate operation includes a data storage operation, data may be stored in the encrypted data repository. Moreover, if the appropriate operation includes a data retrieval operation, data may be retrieved from the encrypted data repository.

Figure 5:
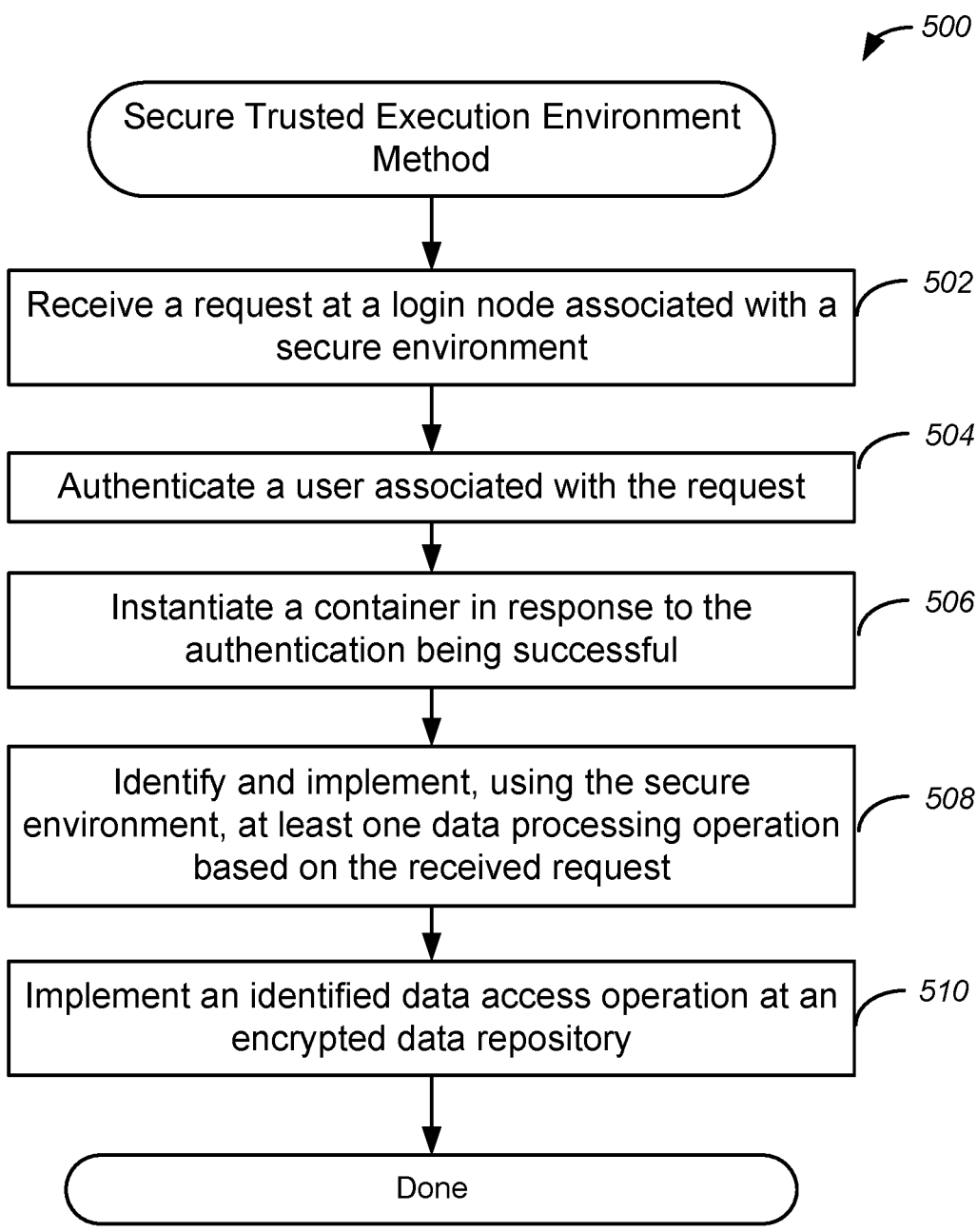
FIG. 5 illustrates a flow chart of another example of a method for implementing a secure trusted execution environment in accordance with some embodiments.

FIG. 5 illustrates a flow chart of another example of a method for implementing a secure trusted execution environment in accordance with some embodiments. As similarly discussed above, such secure environments may be implemented to support scalable and efficient storage and retrieval of data in environments in which sensitive data is stored and maintained. As will be discussed in greater detail below, a method, such as method 500, may be used to store data in an encrypted data repository.

Accordingly, method 500 may commence with operation 502, during which a request may be received at a login node associated with a secure environment. As noted above, a user may generate or initiate a request by requesting access to data that is stored in an encrypted data repository. As noted above, the user may be a user of the system, such as a scientist or statistician, or may be an application or automated process. Moreover, the user may have a distinct and unique user identifier (UID). The request may be generated by the user's computer system or device, and may be sent to the login node.

Method 500 may proceed to operation 504, during which the user associated with the request may be authenticated. Thus, according to some embodiments, a system component, such as a login node, may receive a key from the user as part of the request. This key may be part of a previously generated key pair that was generated and stored by a secure processing device. Accordingly, the key may be received from the user, and during operation 504 it may be determined if the user is authenticated by using the previously generated key pair. If the user is authenticated successfully, method 500 may proceed to operation 506. If not, method 500 may terminate.

Accordingly, method 500 may proceed to operation 506 during which an instance of a container may be instantiated in response to the successful authentication. As noted above, in one example, the container may instead be implemented via instantiation of a virtual machine. In this example, the virtual machine may be implemented to provide a virtualized sandbox layer with which the user is able to communicate with via the login node. The container may be instantiated using resources of the secure environments, and is thus implemented within the secure environment. Moreover, the container may be configured to implement the secure access port described above. In this way, the various input and output policies determined by the secure environment may be implemented for the requested data access operation using a container.

Method 500 may proceed to operation 508, during which one or more components of the secure environment may identify and implement one or more operations based on the received request. Accordingly, one or more components of the secure environment, such as a secure processing device, may identify one or more operations that should be implemented based on one or more data values included in the received request, such as one or more program operations to be implemented. As similarly discussed above, the determination of whether or not such operations should be implemented may be made based on one or more rules and/or permissions. If it is determined that the operations should be implemented, the secure processing device may implement the identified processing operations.

Method 500 may proceed to operation 510, during which an identified data access operation may be implemented. Accordingly, if it is determined that a data access operation should be implemented in accordance with the received request, the data access operation may be implemented at the encrypted data repository. Accordingly, data values may be retrieved from the encrypted data repository, and may be transmitted from the secure environment.

Figure 6:
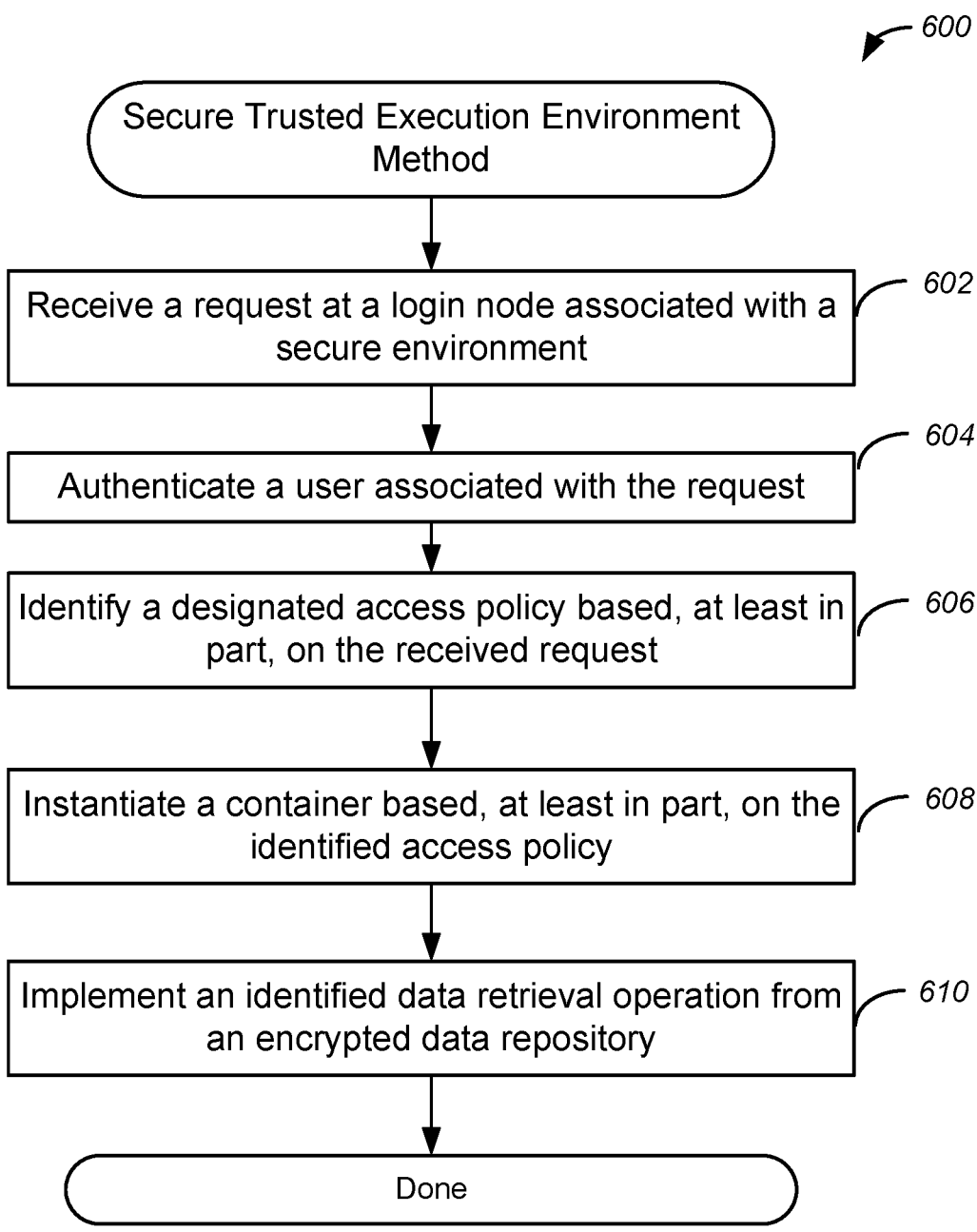
FIG. 6 illustrates a flow chart of yet another example of a method for implementing a secure trusted execution environment in accordance with some embodiments.

FIG. 6 illustrates a flow chart of yet another example of a method for implementing a secure trusted execution environment in accordance with some embodiments. As similarly discussed above, such secure environments may be implemented to support scalable and efficient storage and retrieval of data in environments in which sensitive data is stored and maintained. As will be discussed in greater detail below, a method, such as method 600, may be used to retrieve and move data from an encrypted data repository.

Method 600 may commence with operation 602 during which a request may be received at a login node associated with a secure environment. As noted above, a user may generate or initiate a request by requesting data from an encrypted data repository. Accordingly, the request may be a data retrieval request in which the user requests data be pulled from the secure environment. As noted above, the user may be a user of the system, such as a scientist or statistician, or may be an application or automated process. Furthermore, the user may have UID, and the request may be generated by the user's computer system or device, and may be sent to the login node.

Method 600 may proceed to operation 604 during which the user associated with the request may be authenticated. As discussed above, a system component, such as a login node, may receive a key from the user as part of the request. This key may be part of a previously generated key pair that was generated and stored by a secure processing device. Accordingly, the key may be received from the user, and during operation 604 it may be determined if the user is authenticated by using the previously generated key pair. If the user is authenticated successfully, method 600 may proceed to operation 606. If not, method 600 may terminate.

Method 600 may proceed to operation 606 during which a designated access policy may be identified. Accordingly, a system component, such as a secure processing device, may identify one or more access policies based on the received request. The access policy may be determined based on parameters of the received request, and may also be identified based on parameters of the requested data. For example, the policy may be identified based on the UID, and a user's role associated with such a UID. Moreover, the policy may be identified based on a storage location of the requested data, such as an address range. The policy may also be identified based on a security identifier that identifies a level of security/access to be applied to the stored data. The security identifier may be stored with the requested data itself, or may be stored as part of a previously generated mapping. In various embodiments, the identified policy may be defined by the data owner that originally stored the data, and may have been defined as part of the data storage process. As also noted above, the access policy may include specific data access rules and permissions which may grant access to particular UIDs and classes of UIDs, and may deny access to others. Moreover, such rules may be combined with other rules governing grant and denial of access based on device identifiers as well as patterns of activity, such as repeated access attempts.

Method 600 may proceed to operation 608 during which a container may be implemented to handle the request. As discussed above, the container may be implemented as a virtual machine that is configured as a sandbox layer. Furthermore, the container may be instantiated in a manner such that it is configured to implement various input/output constraints determined by the previously identified access policy. Accordingly, the container is configured to output data only as allowed by the identified access policy and its corresponding output constraints.

Method 600 may proceed to operation 610 during which the requested data is provided to the user. Accordingly, if permitted by the output policy and constraints of the secure access port, the requested data may be provided to the login node, and the login node may pass the requested data along to the user. In this way, output of the requested data may be gated and filtered by the identified access policy, and also subject to user authentication.

FIG. 7 illustrates a flow chart of an additional example of a method for implementing a secure trusted execution environment in accordance with some embodiments. As discussed above, secure environments may be implemented to support scalable and efficient storage and retrieval of data in environments in which sensitive data is stored and maintained. As will be discussed in greater detail below, a method, such as method 700, may be used to identify and implement approved operations on secure data, as well as implement differential privacy policies to further protect the secure data.

Accordingly, method 700 may commence with operation 702 a request received from a user may be authenticated. As similarly discussed above the request may be received via a login node that is communicatively coupled to a secure, trusted environment. As also discussed above, the request may include a requested operation submitted by the user as well as credentials that may be used to authenticate the user. Such credentials may include a key value from a key pair.

For example, a system component, such as a login node, may receive a key from the user as part of the request. This key may be part of a previously generated key pair that was generated and stored by a secure processing device. Accordingly, the key may be received from the user and may be authenticated using the previously generated key pair. If the user is authenticated successfully, method 700 may proceed to operation 704.

Method 700 may proceed to operation 704 during which a plurality of approved operations may be identified based, at least in part, on a rules engine. In various embodiments, a system component, such as a secure processing device may include a dedicated processing component configured to implement a rules engine. In one example, the rules engine includes secure memory storage configured to store approved operations and policies that may be implemented within the secure environment. Such approved operations may be considered "white listed" operations. Accordingly, the secure processing device may utilize the rules engine to query the stored rules and policies, and identify one or more approved operations. The query may be executed based on data included in and associated with the received request. For example, the query may filter approved policies and operations based on aspects of the user's identifiers, such as the user's organization, the user's role, as well as other metadata, such as a time of the request or even patterns of requests that account for previously submitted requests.

Method 700 may proceed to operation 706 during which the at least one approved operation may be implemented to generate a result object. Accordingly, an operation may be executed on data in an encrypted repository. The operation may be executed by a secure processing device and also may utilize the instantiation of a container specific to the approved operation. In one example, such an approved operation may be data retrieval operation in which data is retrieved from a secure and encrypted data repository. In some embodiments, multiple operations may be identified. For example, the secure processing device may identify a data retrieval operation as well as one or more computations to be implemented in an instantiated container.

Method 700 may proceed to operation 708 during which the at least one approved operation may be implemented to generate a results object. Accordingly, the secure processing device may implement any identified approved operations, and may generate a result object that includes one or more data values representing the result of the approved operations. As discussed above, the result object may include a result of one or more processing operations performed on the retrieved data. In various embodiments, the result object is temporarily cached in the secure environment and is not written back to the encrypted data repository thus maintaining integrity and isolation of the encrypted data repository.

Method 700 may proceed to operation 710 during which one or more output policies may be applied to the result object. In various embodiments, the output policies are configured to limit, obfuscate, or hide some data while making accessible other data. More specifically, data retrieved from the encrypted data repository may include data, such as personal data that may underly entries in a database, that is considered private data that should not be shared with all users of a secure environment. Accordingly, output policies may be implemented to hide such data to maintain its privacy while releasing other data that is not private, such as some results of processing or statistical operations on portions of a database.

In one example, one of the previously described approved operations may be a statistical operation implemented on a database, such as SUM, MIN, MAX, AVERAGE, COUNT, or HISTOGRAM. Accordingly, the results of the statistical operation may be output, but only after one or more differential privacy operations has been implemented. For example, if a user queries the number of patients with a particular disease who have a particular gender, ages between a certain range, diagnosis dates within a particular range, and live in a particular geographic area, the response may generate a result that is very small relative to the total amount of data, and the providing of such a result could identify the presence of a particular record in the database, and would not adhere to the principles of differential privacy. Accordingly, randomized noise from within a bounded range is added to each query to obfuscate the real result of the query while still providing a result that is close enough to the real result that the statistical value of the underlying data is not significantly degraded. For example, if the actual response is 15, the database may be configured to provide a response of 15 but at other times, may provide a response of 13 or 16, etc. Some examples of such noising operations used in differential privacy techniques disclosed herein may include the addition of LaPlace noise or the addition of Gaussian noise in accordance with a previously-defined privacy loss parameter.

The specific choice of the privacy loss parameter is typically a function of the underlying data but may be determined based on additional privacy concerns associated with the data owner, or additional utility requirements associated with a data analyst. The amount of noise that is determined to be added is a function of the privacy loss parameter and the nature of the underlying data as well. If the amount of privacy loss allowed is very low, more noise is added, and vice versa. Thus, according to various embodiments disclosed herein, systems may be configurable such that output policies may be configured by an entity, such as an administrator, based on a value set for a privacy loss parameter.

In addition, the larger and more "regular" the dataset is, and the less the fields within the dataset are correlated, the lower the privacy loss parameter can be set. For smaller datasets in which there are significant outliers and a great deal of correlation between fields in which any one field reveals a significant amount of information about other fields, the privacy loss parameter may be set higher. For example, if there are only a very small number of people (e.g. 20, 50, or 100), and there is a dataset containing information on their salaries, their geographic location of residence, and their prevalence of certain medical issues, the responses, without noise, may widely vary, with salaries ranging from those earned by people earning minimum wage up to the wealthiest individuals. In between, values may be more regular, as is typically in a standard distribution, but there will still exist outliers. In such a situation, the outliers may be clipped, or normalized, and/or much more noise may be added to hide the true value. Further, the values in the query are likely to be highly correlated—for example, people of specific incomes typically live in geographic areas near other people with similar incomes, and also tend to acquire similar health conditions to those of comparable income as well, thereby unintentionally allowing more information to leak. In various embodiments, additional noise might be added to compensate when such correlations might be present.

Differential privacy can also be applied to other operations, including, but not limited to, machine learning models or artificial intelligence neural networks, in which a model or network can be trained on sensitive data, but can generate an output that inhibits model inversion attacks or other approaches for revealing the sensitive input data used as part of the training. In various embodiments, a model may be trained separately on multiple databases containing sensitive data—e.g. "distributed learning" or "federated learning"— but upon outputting the model subsequently to each training, can still be made differentially private, enabling distributed, differentially private machine learning model training.

Other output policies may be used as well, as appropriate to the dataset, including policies that simply mask or generalize certain fields, such as k-anonymity. For example, a database query that requests a list of all records in a particular database may hide the two least significant digits of a zip code or the last octet of an IP address in order to make the output less specific and therefore less identifiable. An output policy may even be the most general sort of policy, such as one that permits output of a binary "yes" or "no" question—for example, "are all patients admitted with this disease more than 50 years old?"

The previously described embodiments are not an exhaustive list of output policies, nor do all outputs need to pertain to operations on a database. Many kinds of operations are possible, as are many data storage scenarios and data formats. The way data is stored, processed, and output are customized and determined based on the nature of the data, the security and privacy policies established by the data owner, and a data analyst's use case. Embodiments disclosed herein provide a framework for many such operations in a secure and privacy-preserving manner.

In some embodiments, the implementation of the differential privacy policies may be handled by a secure access port. Accordingly, the selection and implementation of the differential privacy policy may be specifically configured based on the identification and authentication information of the user, metadata associated with the user and the request, as well as previous activity of the user. As similarly discussed above, such information may include the user's role, organization, as well as previous history of requests. In this way, the secure access ports may be configured to implement an additional layer of data security by providing additional security operations that may be configured and implemented independent of the secure processing device.

Method 700 may proceed to operation 712 during which an output may be generated based on a result of the at least one approved operation and the differential privacy policy. In various embodiments, the output is an output data object that may be transmitted to a user. For example, the output may be a message that includes results of the previously described operations, and may be sent to the user via a login node with which the user is already in communication. In this way, the user may be provided with results responsive to the user's request and in accordance with the policies managed by the secure processing device and/or secure access port.

While various embodiments disclosed herein have been described with reference to data access operations, it will be appreciated that data storage operations may be implemented as well. In some embodiments, a request may be received at a login node for a data storage operation, a user associated with the request may be authenticated, a container may be instantiated to handle the request, one or more data processing operations may be implemented, and the data storage operation may be implemented at the encrypted data repository. In various embodiments, one or more additional rules and/or policies are identified to implement the data storage operation. In this way, an additional set of policies may be used to further constrain the user's interaction with the encrypted data repository, and provide an additional layer of security for data storage operations. In some embodiments, the additional security may include additional implementations of guards and sandboxing, as similarly described above.

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatus. Accordingly, the present examples are to be considered as illustrative and not restrictive.

What is claimed is:

1. A system comprising:
a login node comprising one or more processors configured to receive, from a user separate from the login node, a request associated with target data;
a secure access port, communicatively coupled to the login node, configured to process the request in accordance with one or more data access policies by identifying one or more data processing operations from a set of data processing operations based on both a time associated with the request and a pattern associated with different requests submitted prior to the request, wherein the secure access port comprises a container execution environment in which the one or more data access policies are applied to the request;
a secure processing hardware communicatively coupled to the secure access port to receive the request provided by the login node and comprising an encrypted portion configured to implement the one or more data processing operations and directly provide a response to the user without communicating through the login node that provided the request to the secure processing hardware, wherein the encrypted portion comprises a trusted execution environment configured to apply, to the response, one or more output policies configured to permit output of statistical results derived from the target data after randomized noise from within a bounded range is added to the statistical results to obfuscate the target data and wherein the one or more data processing operations are executed within the trusted execution environment, wherein the secure processing hardware corresponds to one or more central processing units (CPUs); and
an encrypted data repository communicatively coupled to the secure processing hardware, the encrypted data repository comprising one or more storage devices, and being configured to encrypt and store data in the one or more storage devices, and wherein the trusted execution environment brokers access to the one or more storage devices.

2. The system of claim 1, wherein the container execution environment is configured to implement a sandbox layer.

3. The system of claim 2, wherein the container execution environment is configured to implement a virtual environment.

4. The system of claim 1, wherein the secure processing hardware is configured to implement hardware encryption.

5. The system of claim 4, wherein the hardware encryption of the secure processing hardware is implemented via a secure portion of a main processor.

6. The system of claim 1, wherein the secure processing hardware is configured to implement software encryption.

7. The system of claim 1 further comprising:

an additional secure access port communicatively coupled to the login node and configured to process the response to the request in accordance with one or more data access policies.

8. The system of claim 1, wherein the login node is one of a plurality of nodes in cluster of nodes.

9. A method comprising:

receiving, at a secure access port of a secure environment from a user via a login node, a request associated with target data;

processing the request in accordance with one or more data access policies to provide a response by identifying one or more data processing operations from a set of data processing operations based on both a time associated with the request and a pattern associated with different requests submitted prior to the request;

determining, using a secure processing hardware of the secure environment, if the one or more data processing operations should be implemented based on the received request, wherein the secure access port comprises a container execution environment in which the one or more data access policies are applied to the request to determine if the processing operations should be implemented, and wherein the processing device comprises a trusted execution environment and in which the one or more data processing operations implemented, wherein the secure processing hardware corresponds to one or more central processing units (CPUs), wherein the trusted execution environment configured to apply, to the response, one or more output policies configured to permit output of statistical results derived from the target data after randomized noise from within a bounded range is added to the statistical results to obfuscate the target data; and initiating, by the trusted execution environment, communication with an encrypted data repository responsive to the determining, the encrypted data repository being communicatively coupled to the secure environment.

10. The method of claim 9, wherein the authenticating further comprises:

authenticating a key included in the request.

11. The method of claim 9, wherein the determining further comprises:

identifying the one or more data access policy based, at least in part, on the received request.

12. The method of claim 11 further comprising:

instantiating the container execution environment based, at least in part, on the identified one or more data access policies.

13. The method of claim 12, wherein the instantiating of the container execution environment further comprises:

implementing a sandbox layer.

14. The method of claim 9, wherein the request is a data access request.

15. A device comprising:

a secure access port communicatively coupled to a login node and configured to receive, from a user separate from the login node, a request associated with target data, the secure access port comprising a container execution environment configured to process the request in accordance with one or more data access policies by identifying one or more data processing operations from a set of data processing operations based on both a time associated with the request and a pattern associated with different requests submitted prior to the request; and a secure processing hardware communicatively coupled to the secure access port and comprising an encrypted portion configured to implement the one or more data processing operations and directly provide a response to the user without communicating through the login node, the secure processing hardware being communicatively coupled to an encrypted data repository, wherein the encrypted portion of the secure processing hardware comprises a trusted execution environment and wherein the one or more data processing operations are executed within the trusted execution environment configured to apply, to the response, one or more output policies configured to permit output of statistical results derived from the target data after randomized noise from within a bounded range is added to the statistical results to obfuscate the target data, and wherein the trusted execution environment brokers access to the encrypted data repository, wherein the secure processing hardware corresponds to one or more central processing units (CPUs).

16. The device of claim 15, wherein the container execution environment is configured to implement a sandbox layer.

17. The device of claim 16, wherein the container execution environment is configured to implement a virtual environment.

18. The device of claim 15, wherein the secure processing hardware is configured to implement hardware encryption.

19. The device of claim 18, wherein the secure processing hardware comprises a main processor, and wherein the main processor comprises a secure portion encrypted at a hardware level.

20. The device of claim 15, wherein the device further comprises:

an additional secure access port communicatively coupled to the login node and configured to process the response to the request in accordance with one or more data access policies.

* * * * *